United States Patent
Yoshimura et al.

(10) Patent No.: US 7,428,083 B2
(45) Date of Patent: Sep. 23, 2008

(54) DOCUMENT READER AND IMAGE FORMING APPARATUS

(75) Inventors: Yoshiko Yoshimura, Nara (JP); Nobuya Kishi, Yamatokoriyama (JP); Hirofusa Takekuma, Nara (JP); Masashi Tanimoto, Soraku-gun (JP); Takateru Yamamoto, Uji (JP)

(73) Assignee: Sharp Kabushiki Kaisha, Osaka (JP)

( * ) Notice: Subject to any disclaimer, the term of this patent is extended or adjusted under 35 U.S.C. 154(b) by 998 days.

(21) Appl. No.: 10/446,395

(22) Filed: May 28, 2003

(65) Prior Publication Data

US 2003/0231356 A1 Dec. 18, 2003

(30) Foreign Application Priority Data

May 29, 2002 (JP) ............................ P2002-156100

(51) Int. Cl.
*H04N 1/04* (2006.01)
(52) U.S. Cl. ..................... 358/474; 358/487; 358/492; 358/496
(58) Field of Classification Search ................ 358/474, 358/487, 492, 496, 498; 355/75
See application file for complete search history.

(56) References Cited

U.S. PATENT DOCUMENTS

| | | | | |
|---|---|---|---|---|
| 4,248,530 A | * | 2/1981 | Bockemuhl-Simon et al. | ... 355/74 |
| 5,673,105 A | * | 9/1997 | Brook, III | ..................... 355/75 |
| 6,678,077 B1 | * | 1/2004 | Huang | ......................... 358/497 |
| 6,785,025 B1 | * | 8/2004 | Dawe et al. | ................. 358/474 |
| 6,791,724 B2 | * | 9/2004 | Khovaylo et al. | ........... 358/497 |
| 6,947,185 B2 | * | 9/2005 | Khovaylo et al. | ........... 358/474 |

FOREIGN PATENT DOCUMENTS

| | | |
|---|---|---|
| JP | S52-104124 A | 9/1977 |
| JP | S61-107336 A | 5/1986 |
| JP | H03-181969 A | 8/1991 |
| JP | 07-072555 | 3/1995 |
| JP | 2001-197251 * | 7/2001 |

* cited by examiner

*Primary Examiner*—Houshang Safaipour
(74) *Attorney, Agent, or Firm*—David G. Conlin; David A. Tucker; Edwards Angell Palmer & Dodge LLP

(57) ABSTRACT

An improved document reader is provided, including: a platen for an original document to be placed thereon; and a hold-down member capable of opening and closing relative to the platen and operative to press the original document against the platen so as to make the original document stationary when in a closed state, wherein: the hold-down member includes a plurality of pressing sections arranged adjacent to each other, the pressing sections having respective grips which, except the grip, are engageable with respective notches defined by the pressing sections, respectively.

4 Claims, 6 Drawing Sheets

DOCUMENT READER AND IMAGE FORMING APPARATUS

BACKGROUND OF THE INVENTION

1. Field of the Invention

The present invention relates to a document reader comprising a platen for an original document to be placed thereon and a hold-down member capable of opening and closing relative to the platen, and to an image forming apparatus provided with the document reader.

2. Description of the Related Art

Document readers of the type for reading a document made stationary, in general, read image information from an original document placed stationarily on a platen glass by moving a document scanning optical unit positioned below the platen glass for reading the original document.

Such a document reader is provided with a hold-down member for fixing an original document into intimate contact with the platen glass in order to read image information from the original document. Usually, the hold-down member is pivotally mounted on the document reader body so as to be openable and closable relative to the platen glass.

In reading an original document with such a document reader, the user first opens the platen glass, places the original document on the platen glass, and then closes the hold-down member to fix the original document on the platen glass into intimate contact with the platen glass. By so doing, the original document is set stationary on the platen glass at a predetermined position as pressed against the platen glass, whereby the document reader is allowed to read image information from the original document under favorable conditions.

Such hold-down members generally have substantially the same size as a maximum-size document that can be wholly read at a time by the document reader and are frequently large-sized as large as A1 size, A0 size or the like.

With such a large-sized hold-down member opening and closing, an original document placed on the platen glass is sometimes moved off its right placement position due to wind pressure generated by the opening and closing of the hold-down member moving or by a like cause.

That is, such wind pressure makes it difficult to place the original document at its proper position on the platen glass and, hence, it is possible that the image of the original document is read as moved off its right position or partially lacking.

Such a document reader may be provided on a composite apparatus having multiple functions such as a copying machine or a printer. In this case the image reader is disposed in an upper portion of the composite apparatus.

For this reason, if the composite apparatus is provided with plural sheet feeding cassettes in tiers, the level at which the hold-down member is disposed becomes undesirably high, which might make it difficult for the user to open and close the hold-down member.

In an attempt to overcome this inconvenience, a prior-art document reader, as disclosed in Japan Patent Laid Open Hei No. 7-72555 for example, has a hold-down member provided with grips on a front side and opposite lateral sides thereof for allowing the user to open and close the hold-down member from any one of these three sides.

Further, each of the grips in the document reader disclosed in the aforementioned publication is slidable to a position at which the user can manipulate the grip easily. Thus, the grips allow the user to open and close the hold-down member from any direction with respect to the document reader thereby imparting the document reader with improved open/close operability.

The prior-art document reader, however, involves the problem that the hold-down member has increased size and weight because of the provision of the plural grips rendered slidable. Such increased size and weight lower the convenience in opening and closing the hold-down member and might make it difficult for children and handicapped persons in particular to open and close the hold-down member smoothly.

As described above, the hold-down member of the aforementioned document reader has substantially the same size as a maximum-size document that can be wholly read at a time by the document reader. For this reason, the whole hold-down member has to be opened and closed whenever the document reader is to read an original document, regardless of the size of the document. Therefore, the increase in the size and weight of the hold-down member constitutes an important factor that deteriorates the open/close operability of the hold-down member.

Accordingly, it is an object of the present invention to provide a document reader which is capable of properly adjusting the operability of its hold-down member in accordance with the size of an original document to read thereby effectively preventing the original document from moving off its right position.

If such a document reader is capable of recognizing the size of the original document upon placement of the original document, a region of the original document that should be subjected to reading can be determined before the reading of the original document without the need to prescan the original document and, therefore, an improved reading efficiency can be expected.

Another object of the present invention is to provide an image forming apparatus provided with such a document reader.

SUMMARY OF THE INVENTION

According to the present invention, there is provided a document reader comprising:

a platen for an original document to be placed thereon; and a hold-down member capable of opening and closing relative to the platen and operative to press the original document against the platen so as to make the original document stationary when in a closed state, the hold-down member including a plurality of pressing sections arranged adjacent to each other.

A hold-down member of the conventional type has substantially the same size as a maximum-size document that can be wholly read at a time by the document reader. For this reason, the whole hold-down member has to be opened and closed whenever an original document is to be read, regardless of the size of the original document. Therefore, the open/close operability of the conventional hold-down member is unsatisfactory.

In the document reader of the above-described construction according to the present invention, the hold-down member has a pressing part divided into plural pressing sections. With this hold-down member, one or a plurality of adjacent pressing sections to be opened and closed can be selected appropriately to meet the size of an original document to read. Thus, the original document can be placed stationarily on the platen by being held down with the selected pressing section (s). That is, an original document of a predetermined size such as a standard size can be placed on the platen by opening and closing at least one pressing section.

When the document reader is to read an original document of a smaller size than a maximum-size document that can be wholly read by the document reader, it is sufficient to open and close an appropriate number of pressing sections corresponding to the size of the original document selectively without the need to open and close the whole hold-down member.

Since the pressing sections of the hold-down member are selectively opened and closed as described above, the weight of the selected pressing section(s) is lower than that of the whole hold-down member, which allows the user to perform the opening/closing operation easily and smoothly.

Further, since the opening/closing operation of selected one(s) of the pressing sections generates a lower wind pressure than does the opening/closing operation of the whole hold-down member, possibilities of inconveniences due to the resulting wind pressure, including the possibility that the resulting wind pressure causes the original document to move off its right placement position on the platen or fall down from the platen, can be reduced.

Moreover, since plural pressing sections can be opened and closed at a time, an original document having any one of various sizes can be placed stationarily on the platen before reading when one or plural pressing sections are opened.

These and other objects, features and attendant advantages of the present invention will become apparent from the reading of the following detailed description in conjunction with the accompanying drawings.

DETAILED DESCRIPTION OF THE PREFERRED EMBODIMENTS

Hereinafter, document reader and image forming apparatus embodying the present invention will be described in detail with reference to the accompanying drawings.

Figure 2:
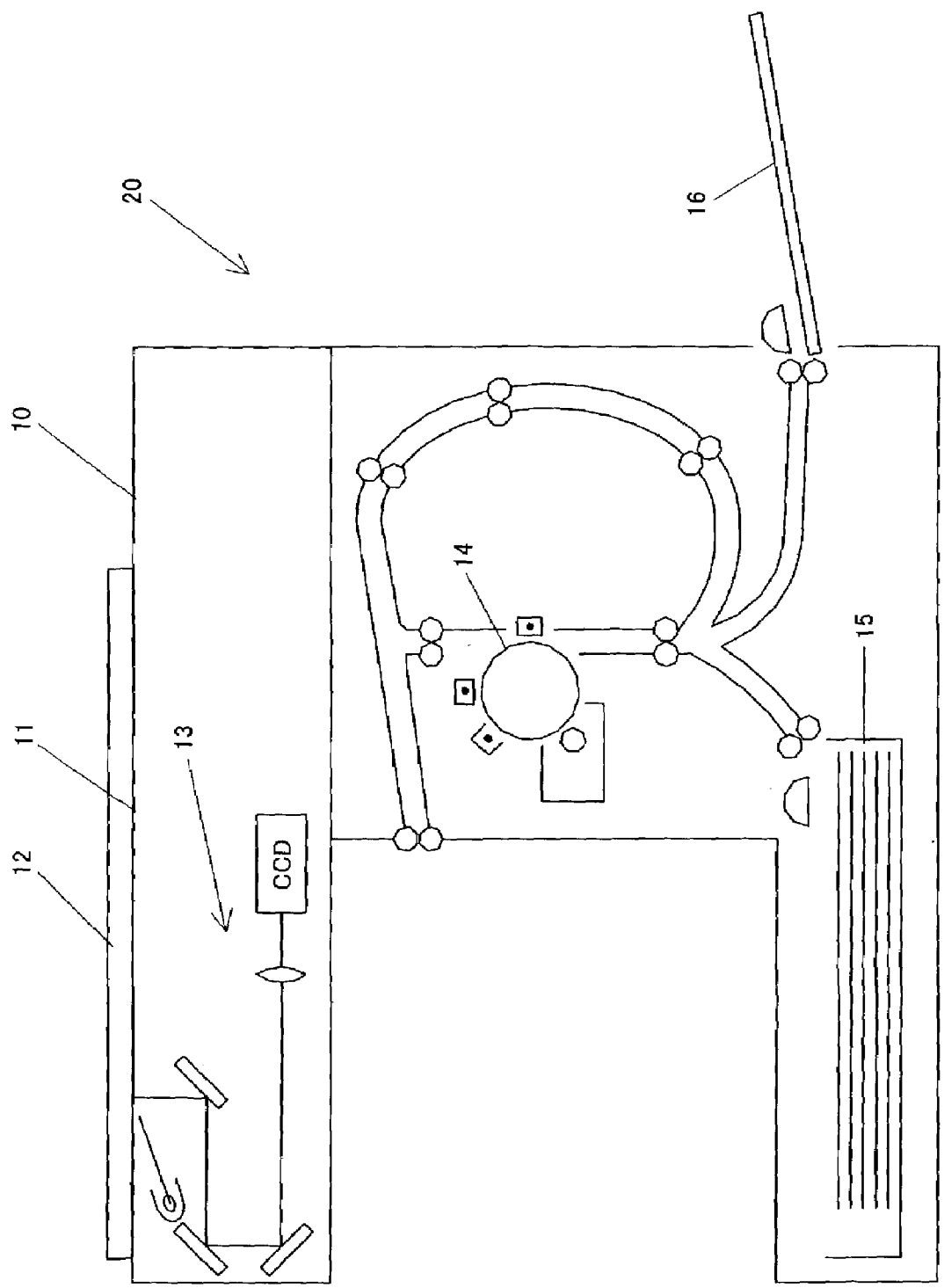
FIG. 2 is a schematic view illustrating the construction of an image forming apparatus provided with the document reader.

Referring first to FIG. 2, there is shown an image forming apparatus 20 provided with a document reader 10 including platen glass (platen) 11 formed of glass or the like and an optical unit 13 disposed below the platen glass 11. A substantially rectangular hold-down cover (hold-down member) 12 is provided in association with the platen glass 11. The hold-down cover 12 is pivotally mounted at its one edge on the image reader 10 so as to be openable and closable.

Figure 1A:
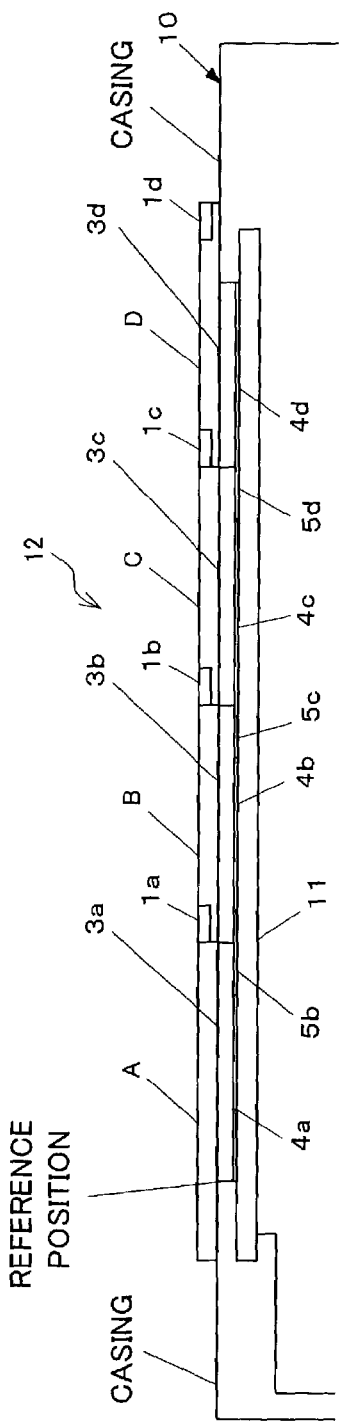
FIGS. 1A and 1B schematically illustrate a portion of interest of a document reader embodying the present invention.
Figure 3:
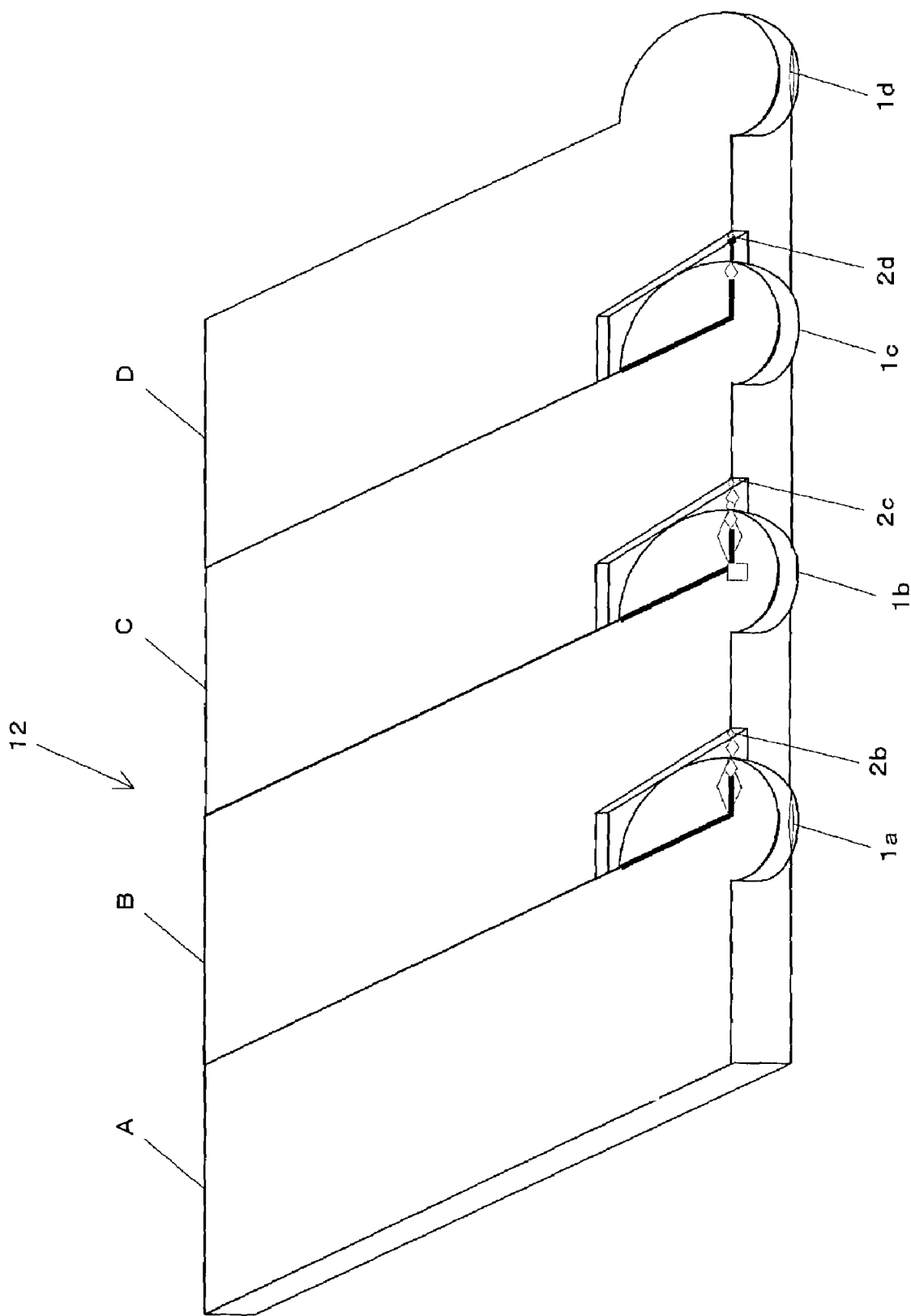
FIG. 3 is a perspective view showing a hold-down member of the document reader.

As shown in FIGS. 1A and 3, the hold-down cover 12 includes hold-down plates (pressing sections) A, B, C and D arranged adjacent to each other, the hold-down plates being sections of the hold-down cover 12. The hold-down plates A, B, C and D are provided with grips 1a, 1b, 1c and 1d, respectively, at the other edge (open/close side) of the hold-down cover 12 which is opposite to the edge pivoted to the image reader 10, as better shown in FIG. 3. The hold-down plates B to D are formed with notches 2b, 2c and 2d, respectively, for engaging the respective grips 1a, 1b and 1c of the hold-down plates A, B and C located adjacent to the hold-down plates B, C and D, respectively. In a state where all the grips 1a, 1b and 1c are engaged by the corresponding notches 2b, 2c and 2d, the outer surface of the hold-down plates A to D are flush with each other, thus presenting an aesthetically improved appearance.

The hold-down plates A and D each form an end portion of the hold-down cover 12, as shown in FIG. 3. For this reason, in the document reader 10 according to this embodiment, the hold-down plate A is not formed with a notch and no notch is provided for engaging the grip 1d of the hold-down plate D. A reference position for placing an original document on the platen glass 11 is marked in an end portion of the platen glass 11 situated to face the hold-down plate A (on the left-hand side in FIG. 3), as shown in FIG. 1A.

The hold-down plates A to D have their respective sizes; for example, the hold-down plate A is sized to meet B5 size and the combination of the hold-down plates A and B is sized to meet A4 size. That is, since the hold-down plate A is combinable with the succeeding hold-down plates B, C and D one after another (i.e., A+B, A+B+C, and A+B+C+D) before the opening/closing operation, the respective sizes of the hold-down plates A to D are established so that a selected combination of hold-down plates is sized to meet a desired one of various standard sizes such as A4 size, B4 size and A3 size for example.

The hold-down plates A, B, C and D further have cushions 3a, 3b, 3c and 3d, respectively, on the side facing the platen glass 11. These cushions 3a to 3d are each formed of a foamed material such as sponge for bringing an original document on the platen glass 11 into intimate contact with the platen glass 11.

The cushions 3a, 3b, 3c and 3d are covered with white plates (reverse overprinting preventive members) 4a, 4b, 4c and 4d, respectively, on the obverse sides thereof for preventing dust and the like from adhering to the platen glass 11 and for preventing an image on the reverse side of an original document from being printed over a wanted image.

Figure 4A:
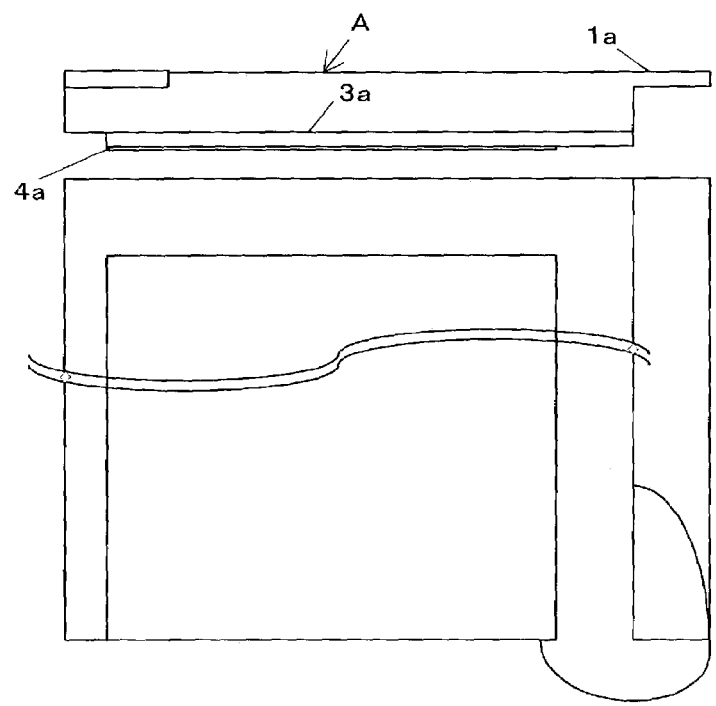
FIGS. 4A and 4B illustrate hold-down plates A and B, respectively.
Figure 4B:
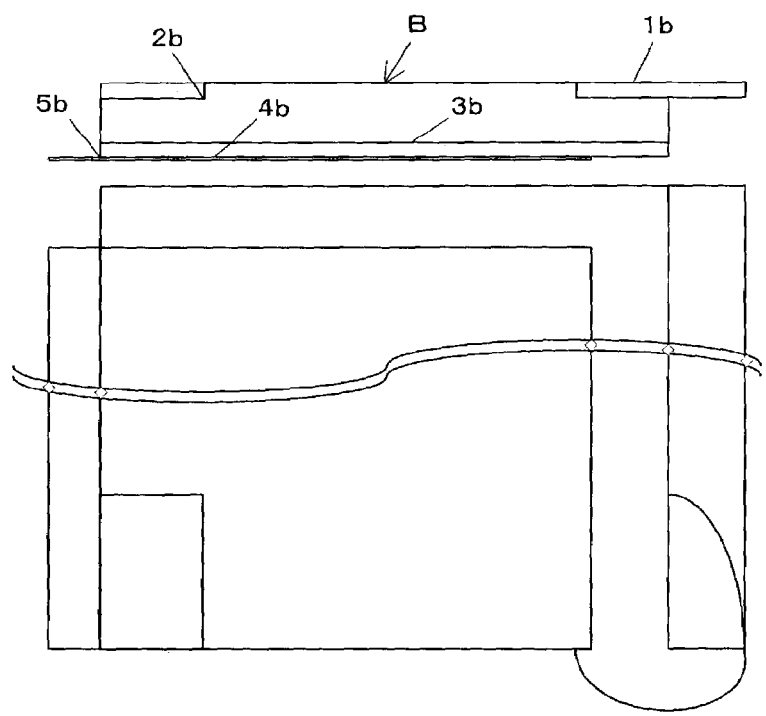
Figure 5:
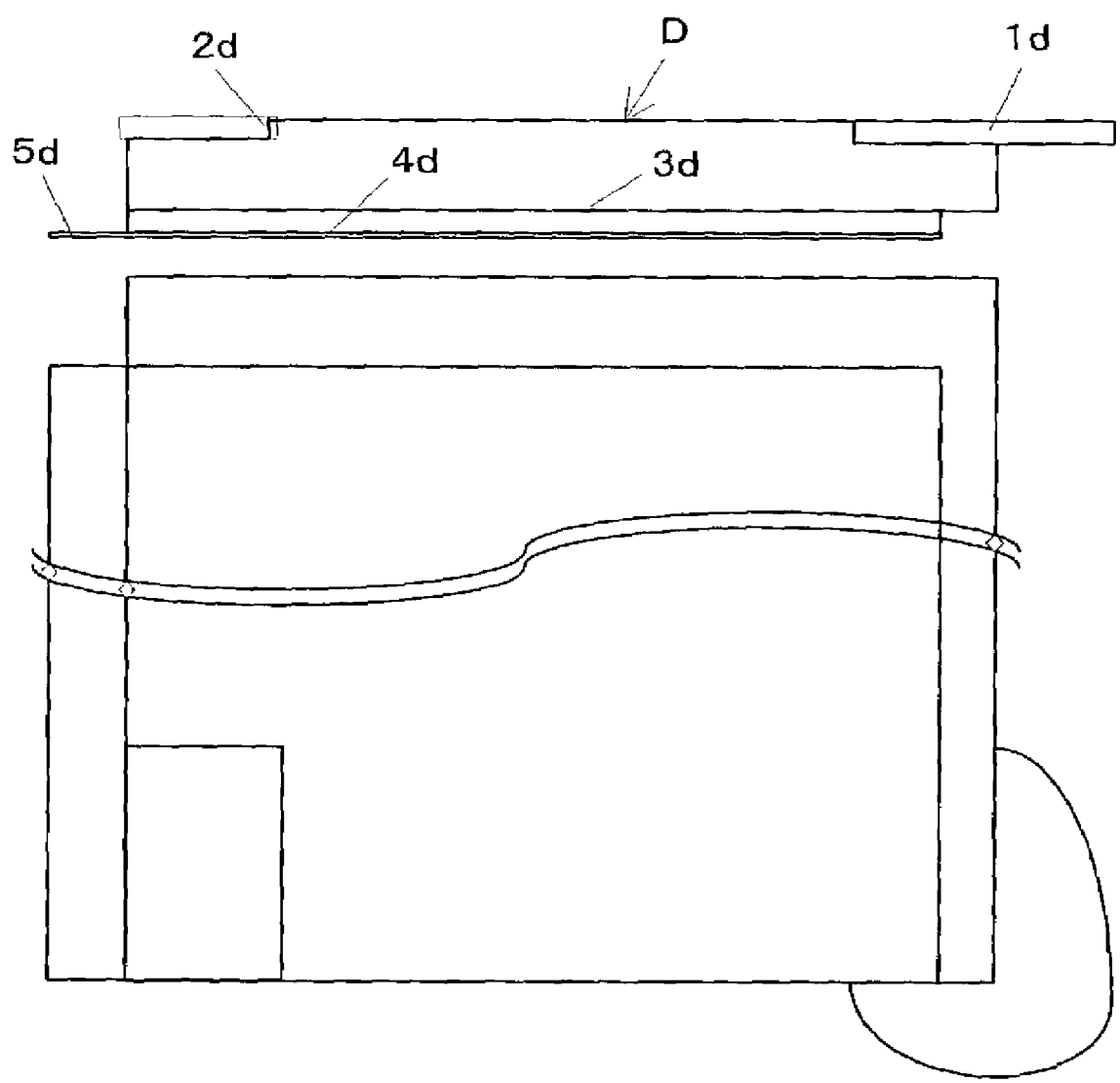
FIG. 5 illustrates a hold-down plate D.

As shown in FIG. 4A, the white plate 4a is positioned so that its edge on the reference position side conforms to an edge of the cushion 3a on the reference position side. As shown in FIGS. 4B and 5, the white plates 4b to 4d extend beyond the respective cushions 3b to 3d on the reference position side so as to overlap the cushions 3a to 3c that are situated adjacent to the cushions 3b to 3d, respectively, on the reference position side.

The respective extension regions of the white plates 4b, 4c and 4d are provided with indicator sections 5b, 5c and 5d each indicating a document placement position and a document size on the side opposite from the side facing the platen glass 11. While FIG. 4B shows the hold-down plate B only, the hold-down plate C is similar to the hold-down plate B shown in FIG. 4B.

Since the white plates 4b to 4d have respective indicator sections 5b to 5d, the white plates 4a to 4c are positioned so as not to cover the corresponding indicator sections 5b to 5d when the hold-down cover 12 is in a closed state.

Stated otherwise, the white plates 4a to 4c do not completely cover the whole surfaces of the respective cushions 3a to 3c but are sized to cover the regions of the cushions 3a to 3c excluding those covered with the indicator sections 5b to 5d. The white plate 4d has an indicator section 5d and is sized to cover the whole surface of the cushion 4d, as shown in FIG. 5.

Thus, when the hold-down cover 12 is closed, the cushions 3a to 3d are wholly covered with the white plates 4a to 4d. When the hold-down plate A is open, the indicator section 5b of the white plate 4b becomes exposed. When the hold-down plates A and B are open, the indicator section 5c of the white plate 4c becomes exposed. When the hold-down plates A to C are open, the indicator section 5d of the white plate 4d becomes exposed.

Figure 1B:
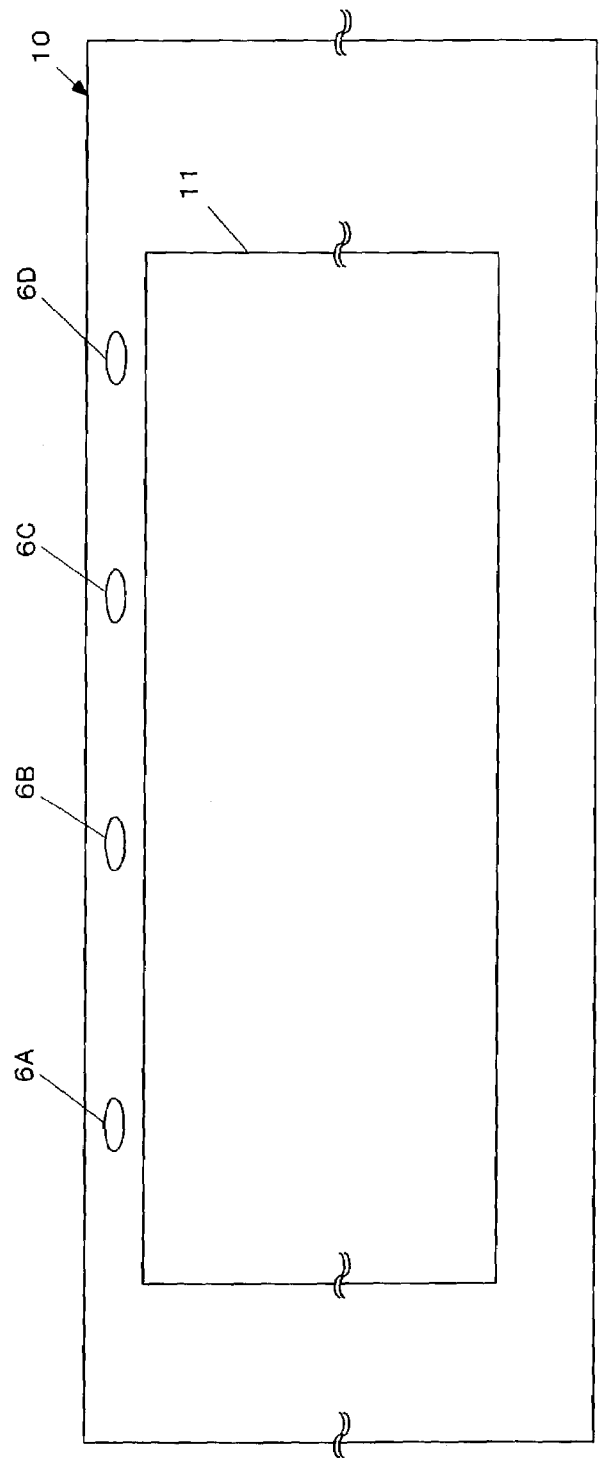

As shown in FIG. 1B, the document reader 10 is provided with sensors 6A, 6B, 6C and 6D at locations adjacent the platen glass 11 so as to correspond to the hold-down plates A, B, C and D, respectively. The sensors 6A to 6D are each operative to judge whether a respective one of the hold-down plates A to B is open or closed, thereby determining the size of an original document on the platen glass 11.

Next, description will be made of how to operate the document reader 10 of the above-described construction for reading an original document.

With the hold-down cover 12 of the document reader 10 in the closed state, when the grip 1a shown in FIG. 3 is raised, only the hold-down plate A assumes an open state to expose a region of the platen glass 11 corresponding to the hold-down plate A. When the grip 1b is raised, the hold-down plate B is raised together with the hold-down plate A of which grip 1a is engaged by the notch 2b of the hold-down plate B. Thus, the hold-down plates A and B assume an open state, so that a region of the platen glass 11 corresponding to the hold-down plates A and B becomes exposed.

Likewise, when the grip 1c is raised, the grip 1b engaging the notch 2c as well as the grip 1a engaging the notch 2b is raised together with the grip 1c. Thus, the hold-down plates A, B and C assume an open state. Similarly, when the grip 1d is raised, all the hold-down plates A to D are raised to expose the whole surface of the platen glass 11.

Thus, it is sufficient for the user to raise any one of the grips 1a to 1d selectively depending on the size of an original document to be read by the document reader 10 and place the original document on the platen glass 11. Therefore, when the document size is small, the user need not open and close all the hold-down plates A to D. The user is sufficient to open and close selected ones of the hold-down plates A to D that are combined depending on the size of an original document to be read by the document reader 10. Accordingly, the opening/closing operation can be achieved easily with reduced labor.

In opening and closing combined ones of the hold-down plates A to D, the user opens and closes the combined ones of the hold-down plates A to D one by one from the hold-down plate A while holding an original document down on the platen glass 11 with one hand. By so doing, the original document is prevented from moving off its proper placement position due to wind pressure or the like generated by the opening/closing of the combined ones of the hold-down plates A to D.

Here, the case where the grip 1a is raised is described as an example. When the grip 1a is raised, the hold-down plate A assumes an open state while the hold-down plates B to D remain in a closed state on the platen glass 11. At this time, the indicator section 5b of the white plate 4b attached to the hold-down plate B becomes exposed to allow the user to recognize the placement position to which an original document is to be placed. In turn, the user places the original document on the platen glass 11 by reference to the document size indicated in the indicator section 5b. Then, the hold-down plate A is closed to bring the original document into intimate contact with the platen glass 11.

The operations of the hold-down plates A to D are sensed by the respective sensors 6A to 6D shown in FIG. 1B. Specifically, in the case described above, the sensor 6A senses the opening/closing operation of the hold-down plate A, while the sensors 6B to 6D sense the closed states of the respective hold-down plates B to D. Based on information sensed by the sensors A to D, a region to be scanned by the optical unit 13 is determined to make the reading of the original document ready to proceed.

In this way the document reader 10 according to this embodiment determines a region to be scanned by the optical unit 13 by means of the sensors 6A to 6D. In contrast, the prior-art document reader checks the size of an original document placed on the platen glass by prescanning in order to determine a region to be scanned by the optical unit. Thus, the document reader 10 according to the subject embodiment does not need prescanning and hence can realize an improved document reading efficiency.

The following description is directed to the image forming apparatus 20 provided with the document reader 10 described above. As shown in FIG. 2, the image forming apparatus 20 reads image information from an original document placed on the platen glass 11 by means of the optical unit 13 included in the document reader 10. Specifically, the optical unit 13 exposes the original document on the platen glass 11 to light and guides light reflected from the original document to a photoelectric converter (CCD) through an imaging lens provided in the optical unit 13.

Image data of the original document read by the CCD is subjected to image processing. According to the image data thus processed, a laser scanning unit (LSU) illuminates the surface of a photosensitive member 14 with laser light to form an electrostatic latent image thereon. The electrostatic latent image thus formed on the surface of the photosensitive member 14 is then developed into a visible image by toner at a developing unit.

On the other hand, recording sheets held in a sheet feeding tray 15 are fed one by one in synchronism with the operation of the photosensitive member 14. The toner image on the photosensitive member 14 is transferred and fixed to a recording sheet fed to a predetermined position and then ejected to an ejected-sheet receiving tray 16.

The image forming apparatus 20 according to this embodiment is capable of determining printing process conditions and the size of a sheet to be fed for printing based on the information obtained by the sensors 6A to 6D of the document reader 10 and the printing conditions inputted by the user such as printing magnification. A region to be scanned by the optical unit 13 and a scanning speed can also be determined based on the information obtained by the sensors 6A to 6D, the printing conditions inputted, and the like.

Figure 6:
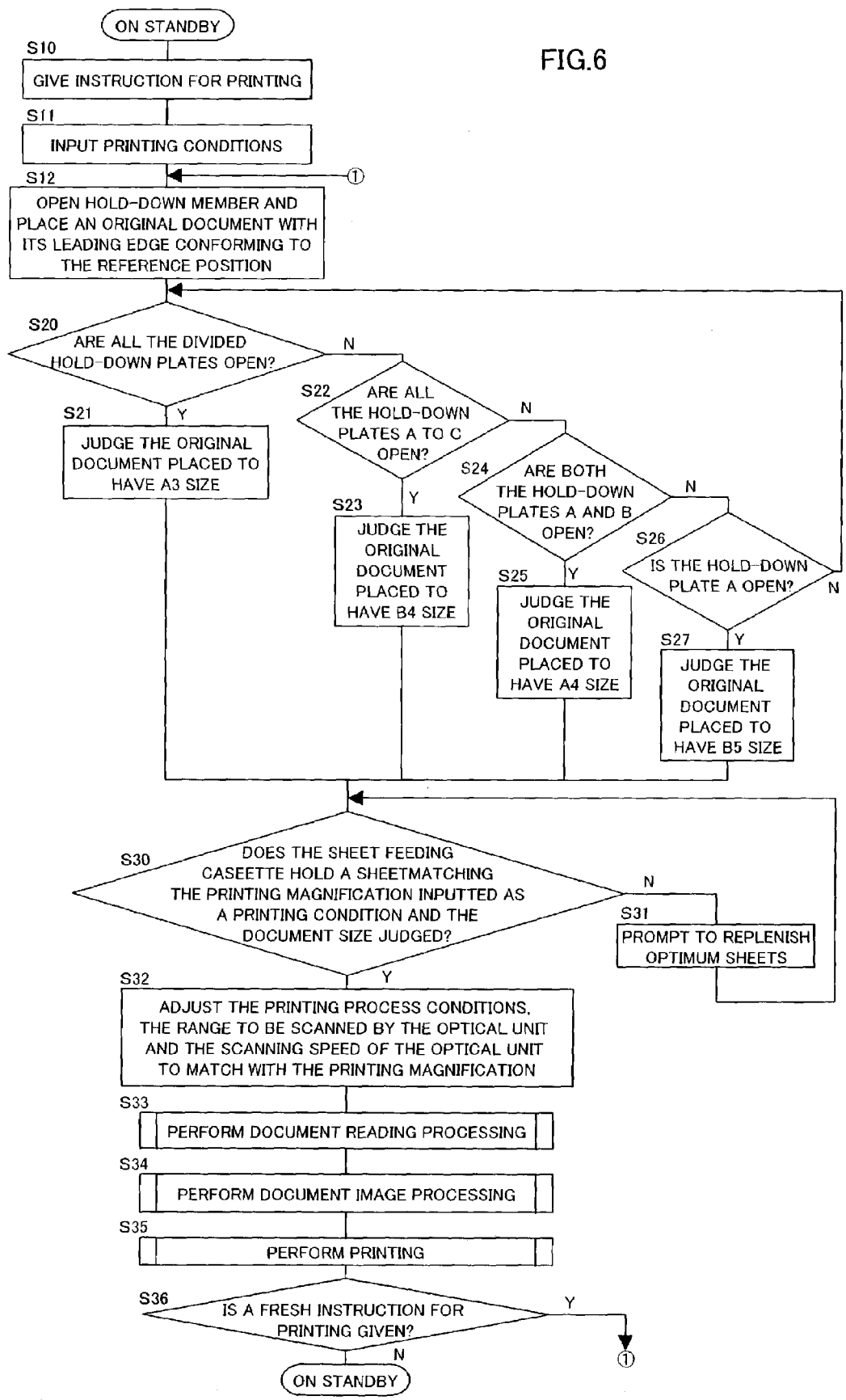
FIG. 6 is a flowchart illustrating the document reading operation and the image forming operation of the image forming apparatus.

Description will be made of the document reading operation and the image forming operation of the above-described image forming apparatus 20 with reference to the flowchart shown in FIG. 6.

It should be noted that the following description is based on the precondition that: when the hold-down plate A shown in FIG. 3 is open, the image forming apparatus 20 allows an original document of B5 size to be placed on the platen glass 11; when the hold-down plates A and B are open, the image forming apparatus 20 allows an original document of A4 size to be placed on the platen glass 11; when the hold-down plates A to C are open, the image forming apparatus 20 allows an original document of B4 size to be placed on the platen glass 11; and when the hold-down plates A to D are open, the image forming apparatus 20 allows an original document of A3 size to be placed on the platen glass 11.

When the image forming apparatus 20 in a standby state is given an instruction for printing at step S10, the user is allowed to input desired printing conditions at step S11. At step S12, the user raises any desired one of the grips 1*a* to 1*d* of the hold-down plates A to D selectively depending on the size of an original document to be read by the document reader 10 and places the original document on the platen glass 11 (FIG. 2). In placing the original document the leading edge of the original document is made to conform to the reference position on the platen glass 11.

Subsequently, at step S20, the sensors 6A to 6D (FIG. 1B) of the document reader 10 judge whether the hold-down plates A to D are all open. If all the hold-down plates A to D are judged to be open at step S20, the original document on the platen glass 11 is judged to have A3 size at step S21, and the process proceeds to step S30.

If not all the hold-down plates A to D are judged to be open at step S20, the process proceeds to step S22. At step S22, the sensors 6A to 6D judge whether the hold-down plates A to C are all open. If all the hold-down plates A to C are judged to be open at step S22, the original document on the platen glass 11 is judged to have B4 size at step S23, and the-process proceeds to step S30.

If not all the hold-down plates A to C are judged to be open at step S22, the process proceeds to step S24. At step S24, the sensors 6A to 6D judge whether the hold-down plates A and B are both open. If both the hold-down plates A and B are judged to be open at step S24, the process proceeds to step S25. If not both the hold-down plates A and B are judged to be open at step S24, the process proceeds to step S26. If the process proceeds to step S25, the original document on the platen glass 11 is judged to have A4 size, and the process proceeds to step S30.

If the process proceeds to step S26, the sensors 6A to 6D judge whether the hold-down plate A is open. If the hold-down plate A is judged to be open, the original document on the platen glass 11 is judged to have B5 size at step S27, and the process proceeds to step S30. If the hold-down plate A is not judged to be open at step S26, the process returns to step S20 to repeat the aforementioned steps therefrom.

When the process proceeds to step S30, a recording sheet size is determined based on the printing conditions established by the user at step S11 and the size of the original document judged at any one of steps S21, S23, S25 and S27. Further, judgment is made on whether a recording sheet of the size thus determined is held in the sheet feeding tray. If the sheet feeding tray is not judged as holding a recording sheet of an optimum size at step S30, the process proceeds to step S31 to request replenishment of recording sheets of the optimum size and then returns to step S30.

Alternatively, if the sheet feeding tray is judged as holding a recording sheet of the optimum size, the process proceeds to step S32 where settings are made of printing process conditions, a region to be scanned by the optical unit 13 and a scanning speed of the optical unit 13 based on the printing conditions such as printing magnification established by the user at step S11 and the size of the original document judged at any one of steps S21, S23, S25 and S27.

Subsequently, the document reader 10 performs a document reading operation at step S33 and the image forming apparatus 20 performs image processing based on the image information read from the original document at step S34. Subsequently, printing is performed at step S35 and then the process proceeds to step S36 where judgment is made on whether there is given a fresh instruction for printing. If there is given such a fresh instruction for printing, the process returns to step S12 to repeat the aforementioned steps therefrom. Alternatively, if there is not given a fresh instruction for printing, the image forming apparatus 20 resumes the standby state.

In this way, the image forming apparatus 20 performs the document reading operation, image forming operation and the like based on the information obtained by the sensors 6A to 6D of the document reader 10 and the printing conditions inputted by the user.

For this reason, conditions for the operation of the image forming apparatus 20 can be determined without the need to perform prescanning of an original document as described above and, hence, the reading efficiency of the document reader 10 can be improved. Further, the image forming operation of the image forming apparatus 20 can be achieved efficiently.

It is to be noted that the present invention is not limited to the image forming apparatus of the construction shown in FIG. 2 and is applicable to any image forming apparatus regardless of the construction and the type thereof as long as it has at least a platen for an original document to be placed thereon and is constructed to read the original document as held down stationarily on the platen by means of a hold-down member.

As apparent from the foregoing description, the present invention has the following advantages.

Since the hold-down member has a pressing part divided into plural pressing sections, one pressing section or a plurality of adjacent pressing sections to be opened and closed can be selected appropriately to meet the size of an original document to read. Thus, the original document can be placed stationarily on the platen by being held down with the selected pressing section(s). That is, an original document of a predetermined size such as a standard size can be placed on the platen by opening and closing at least one pressing section.

When the document reader is to read an original document of a smaller size than a maximum-size document that can be wholly read by the document reader, it is sufficient to open and close an appropriate number of pressing sections corresponding to the size of the original document selectively without the need to open and close the whole hold-down member.

Since the pressing sections of the hold-down member are selectively opened and closed as described above, the weight of the selected pressing section(s) is lower than that of the whole hold-down member, which allows the user to perform the opening/closing operation easily and smoothly. Further, since the opening/closing operation of selected one(s) of the pressing sections generates a lower wind pressure than does the opening/closing operation of the whole hold-down member, possibilities of inconveniences due to the resulting wind pressure, including the possibility that the resulting wind pressure causes the original document to move off its right placement position on the platen or fall down from the platen, can be reduced.

Moreover, since plural pressing sections can be opened and closed at a time, an original document having any one of various sizes can be placed stationarily on the platen before reading when one or plural pressing sections are opened.

Since the grip of one pressing section engages another pressing section adjacent thereto, opening/closing of the latter pressing section by its grip causes the former pressing section having the grip engaging the latter pressing section to open and close at the same time. Thus, plural pressing sections can be opened and closed at a time.

For this reason, even if the pressing part is divided into plural pressing sections, the opening/closing operation does not become complicated and, hence, the user can open and close the hold-down member simply and conveniently by appropriately selecting at least one pressing section to be opened and closed.

When adjacent pressing sections are closed, the grip of one pressing section engages the notch defined by the adjacent pressing section, the notch having a depth equal to the thickness of the grip. Thus, the outer surface of the pressing sections become flush with each other thereby presenting an aesthetically improved appearance.

In opening and closing plural pressing sections, the user opens and closes the pressing sections one by one while holding an original document down on the platen with one hand. By so doing, the original document can be prevented from moving off its proper placement position due to wind pressure or the like generated by the opening/closing of the pressing sections.

The pressing part is provided with the indicator sections each indicating a document placement position on the platen and the size of an original document placed. Thus, the user is allowed to place an original document into its right placement position on the platen when the pressing sections are opened. Since the user can thus place the original document properly before document reading, the image carried by the original document can be printed without shifting or lacking. Further, the user is allowed to confirm the size of an original document placed on the platen because each indicator section is located adjacent a document placement position.

Since the pressing sections are provided with the respective sensors for detecting their respective opening/closing operations, the document reader is capable of determining the size of an original document placed on the platen. Thus, the document reader is capable of determining a region of the original document to read based on the document size thus determined without the need to perform prescanning of the original document, thereby offering an improved reading efficiency, reducing required printing time in total and saving energy.

Since the document reader has the pressing sections, at least one of which is selectively opened and closed depending on the size of an original document, the pressing sections, which are sections of the hold-down member, can be opened and closed. For this reason, when the hold-down member is to be opened not wholly but partially, the user can perform the opening/closing operation easily and smoothly with reduced labor. Thus, the image forming apparatus provided with the document reader is capable of realizing the document reading operation advantageously.

If the document reader is provided with the sensors, the size of an original document can be detected by the sensors and, hence, it is possible to determine a region of the original document to be read by the document reader, a reading speed and printing process conditions of the image forming apparatus based on the document size thus detected and the printing conditions established by the user such as printing magnification.

While only certain presently preferred embodiments of the present invention have been described in detail, as will be apparent for those skilled in the art, certain changes and modifications may be made in embodiments without departing from the spirit and scope of the present invention as defined by the following claims.

What is claimed is:

1. A document reader comprising:
    a platen for an original document to be placed thereon, said platen being mounted on a platen support structure; and
    a hold-down member capable of opening and closing relative to the platen and operative to press the original document against the platen so as to make the original document stationary when in a closed state,
    the hold-down member comprising:
        multiple, parallel, adjacent pressing sections, each said pressing section being independently attached to said platen support structure in a back side thereof so as to be capable of independent opening and closing relative to the platen,
            wherein each of said pressing sections respectively has means for grasping and operating the opening/closing of the pressing section disposed in a front side thereof, the means for grasping and operating one of said pressing sections being engageable with another of said pressing sections arranged adjacent thereto, and
            wherein said another of said pressing sections engageable with the means for grasping and operating said one of said pressing sections is formed with a notch having a depth equal to a thickness of the means for grasping and operating said one of said pressing sections, whereby the outer surface of said pressing sections are flush with each other when the hold-down member is in a closed state.

2. The document reader according to claim 1, wherein one pressing section arranged adjacent to another pressing section has an indicator section indicating a document placement position and a document size, which indicator section underlies said another pressing section when said one pressing section and said another pressing section are in a closed state while becoming exposed when said another pressing section and said one pressing section are in an open state and in a closed state, respectively.

3. The document reader according to claim 1, further comprising sensors for sensing an opening/closing operation of respective ones of said pressing sections, said sensors being respectively disposed at locations adjacent to the platen corresponding to respective ones of said pressing sections.

4. An image forming apparatus comprising at least a document reader for reading an original document, and an image forming unit for forming an image based on image information obtained by the reading of the original document, the document reader comprising:
    a platen for an original document to be placed thereon, said platen being mounted on a platen support structure; and
    a hold-down member capable of opening and closing relative to the platen and operative to press the original document against the platen so as to make the original document stationary when in a closed state,
    the hold-down member comprising:
        multiple, parallel, adjacent pressing sections, each said pressing section being independently attached to said platen support structure in a back side thereof so as to be capable of independent opening and closing relative to the platen;
            wherein each of said pressing sections respectively has means for grasping and operating the opening/closing of the pressing section disposed in a front side thereof, the means for grasping and operating one of said pressing sections being engageable with another of said pressing sections arranged adjacent thereto, and,
            wherein said another of said pressing sections engageable with the means for grasping and operating said one of said pressing sections is formed with a notch having a depth equal to a thickness of the means for grasping and operating said one of said pressing sections, whereby the outer surface of said pressing sections are flush with each other when the hold-down member is in a closed state.

\* \* \* \* \*